United States Patent

Shen

[11] Patent Number: 5,914,863
[45] Date of Patent: Jun. 22, 1999

[54] SIGNAL ADAPTER

[75] Inventor: Kuei-Hsien Shen, Taipei Hsien, Taiwan

[73] Assignee: Lantek Electronics, Inc., Taipei Hsien, Taiwan

[21] Appl. No.: 08/904,574

[22] Filed: Aug. 4, 1997

[51] Int. Cl.[6] ...................................................... H05K 5/00
[52] U.S. Cl. .......................... 361/752; 361/736; 361/796; 439/76.1; 174/50
[58] Field of Search ..................................... 361/728, 729, 361/730, 736, 740, 748, 752, 796; 439/76.2, 535, 76.1; 174/50; 220/4.02

[56] References Cited

U.S. PATENT DOCUMENTS

| | | | |
|---|---|---|---|
| 3,951,490 | 4/1976 | Devendorf | 439/814 X |
| 4,226,495 | 10/1980 | Palle et al. | 439/535 |
| 5,677,578 | 10/1997 | Tang | 307/147 |

*Primary Examiner*—Leo P. Picard
*Assistant Examiner*—Jayprakash N. Gandhi
*Attorney, Agent, or Firm*—Snider & Chao; Fei-Fei Chao

[57] ABSTRACT

A signal adapter including a first circuit board adapted to process wired TV signal and telephone signal from a first coaxial cable; a first casing holding the first circuit board at its one side and having a plurality of connectors at its opposite side adapted to transmit processed signal from the first circuit board to end users; a first cover fastened to the first casing and covered over the first circuit board, having a main signal input port through which wired TV signal and telephone signal are transmitted from a coaxial cable to the first circuit board, and a main signal output port through which wired TV signal and telephone signal are transmitted from the first circuit board to a next signal adapter through a second coaxial cable; a second circuit board adapted to provide the necessary telephone signal working power supply to the first circuit board; a second casing extended from one side of the first casing and adapted to hold the second circuit board on the inside; and a second cover fastened to the second casing and covered over said second circuit board.

4 Claims, 5 Drawing Sheets

SIGNAL ADAPTER

BACKGROUND OF THE INVENTION

The present invention relates to a signal adapter which uses a common coaxial cable to receive wired TV signal, telephone signal and computer network signal, permitting received signal to be processed by a circuit board and then transmitted to end users.

For transmitting wired TV signal from a wired TV station to an end user, a wired TV coaxial cable signal adapter shall be used. A regular wired TV coaxial cable signal adapter is generally comprised of a casing, a top cover, and a terminal holder. The casing has a main signal input port which receives a coaxial cable for signal input, and a main signal output port which receives a coaxial cable for signal output. The terminal holder is mounted inside the casing, having a signal input terminal and a signal output terminal. The top cover is covered on the casing and holding a circuit board. The circuit board has a signal input plug hole and a signal output plug hole. When the top cover is fastened to the casing, the signal input plug hole and signal output plug hole of the circuit board are respectively connected to the signal input terminal and signal output terminal of the terminal holder. When to use the signal input coaxial cable for receiving wired TV signal and telephone signal, the existing wired TV coaxial cable signal adapter must be removed from the coaxial cables. Before disconnecting the wired TV coaxial cable signal adapter from the coaxial cables, the water-proof jackets must be removed from the coaxial cables. However, it is not easy to remove the water-proof jackets from the coaxial cables. If to remove the wired TV coaxial cable signal adapter by cutting off the coaxial cables, the coaxial cables may become too short.

SUMMARY OF THE INVENTION

The present invention has been accomplished to provide a signal adapter which eliminates the aforesaid problem. It is one object of the present invention to provide a signal adapter which is practical for transmitting wired TV signal, telephone signal as well as computer network signal from a common coaxial cable to individual end users. It is another object of the present invention to provide a signal adapter which can be used to replace an existing wired TV signal adapter by removing the casing of the wired TV signal adapter from its cover and then fastening the first casing of the signal adapter of the present invention to the cover of the wired TV signal adapter. To achieve these and other objects of the present invention, there is provided a signal adapter which comprises a first circuit board adapted to process wired TV signal and telephone signal from a first coaxial cable; a first casing holding the first circuit board at its one side and having a plurality of connectors at its opposite side adapted to transmit processed signal from the first circuit board to end users; a first cover fastened to the first casing and covered over the first circuit board, having a main signal input port through which wired TV signal and telephone signal are transmitted from a coaxial cable to the first circuit board, and a main signal output port through which wired TV signal and telephone signal are transmitted from the first circuit board to a next signal adapter through a second coaxial cable; a second circuit board adapted to provide the necessary telephone signal working power supply to the first circuit board; a second casing extended from one side of the first casing and adapted to hold the second circuit board on the inside; and a second cover fastened to the second casing and covered over said second circuit board.

BRIE DESCRIPTION OF THE DRAWINGS

DETAILED DESCRIPTION OF THE PREFERRED EMBODIMENT

Figure 1:
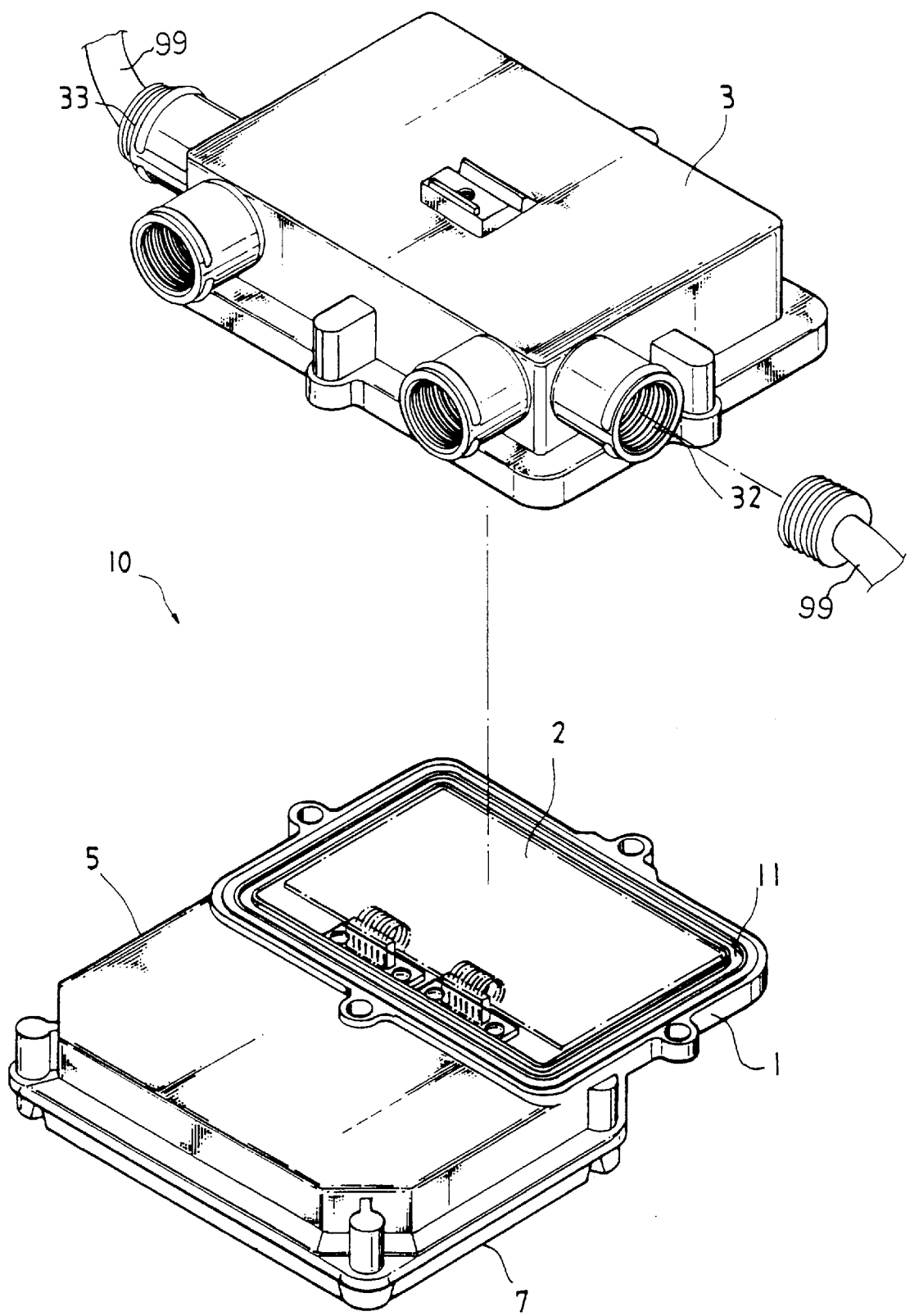
FIG. 1 is a front side view of the present invention, showing the first cover removed from the first casing, the first circuit board mounted within the receiving chamber of the first casing.

Referring to FIGS. from 1 to 3, the signal adapter, referenced by 10, comprises a first casing 1 having a first receiving chamber 11 at one side which receives a first circuit board 2 having an electrically conductive signal input plug hole 21 and an electrically conductive signal output plug hole 22, and a plurality of signal connectors 12 at an opposite side respectively connected to the first circuit board 2 by conductors and adapted for receiving signal lines from end users.

Figure 2:
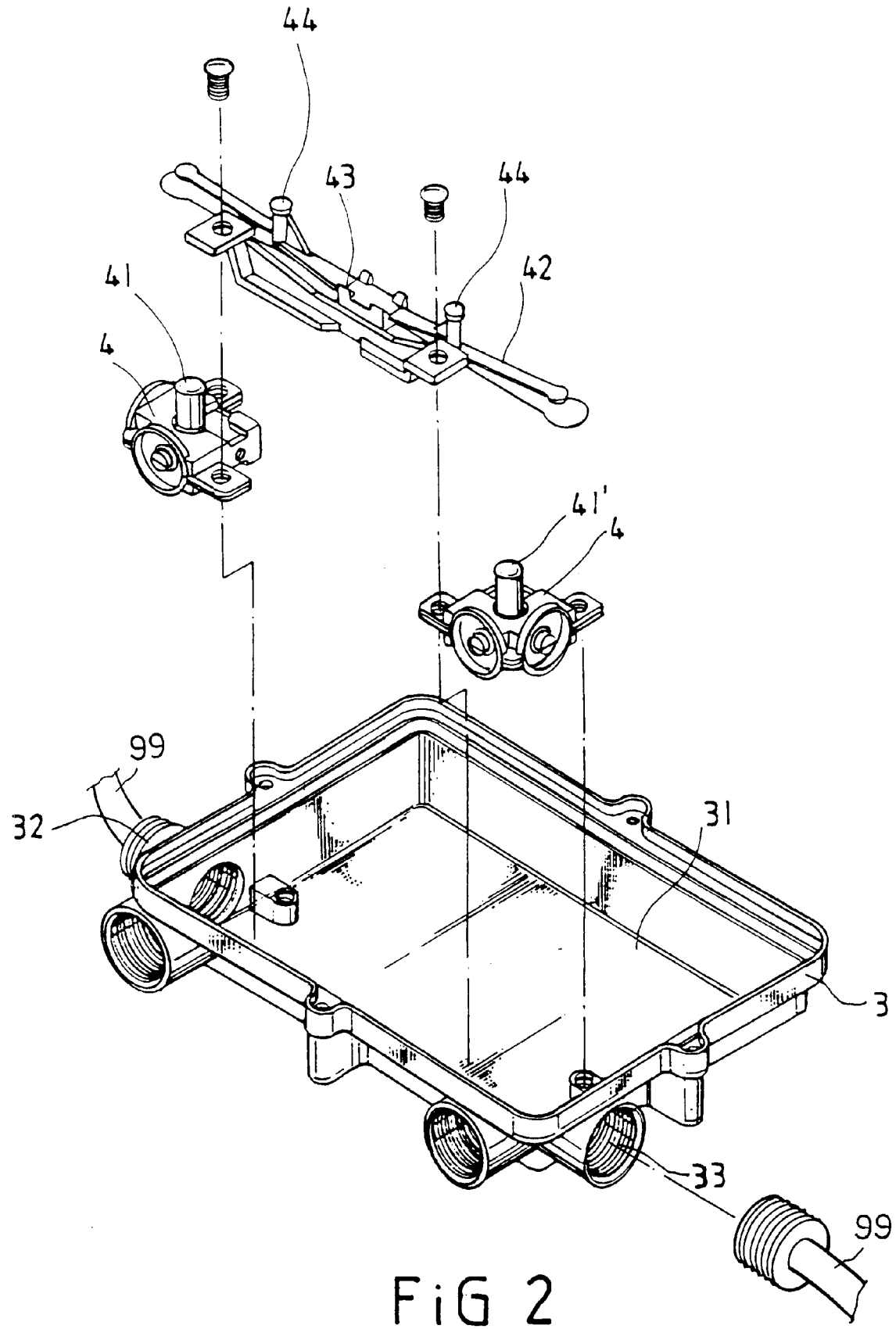
FIG. 2 is an exploded view of the first cover showing the arrangement of the metal spring plate, the locating plate, the terminal holders, and the signal terminals according to the present invention.

Referring to FIGS. 1–2 again, a first cover 3 is fastened to the first casing 1 by fastening elements for example screws and covered on the first receiving chamber 11 of the first casing 1 over the first circuit board 2, having a receiving chamber 31, at least one main signal input port 32 at one end, and at least one main signal output port 33 at an opposite end. Two terminal holders 4 are mounted in the receiving chamber 31 of the first cover 3 and respectively disposed adjacent the main signal input port 32 and the main signal output port 33, holding a respective signal terminal 41;41' adapted for connecting to a respective coaxial cable 99 which comes from the main signal input port 32 or extends out of the main signal output port 33. When the first casing 1 and the first cover 3 are fastened together, the electrically conductive terminals namely the first signal terminal 41 and the second signal terminal 41' are respectively plugged into the electrically conductive signal input plug hole 21 and electrically conductive signal output plug hole 22 of the first circuit board 2.

Figure 3:
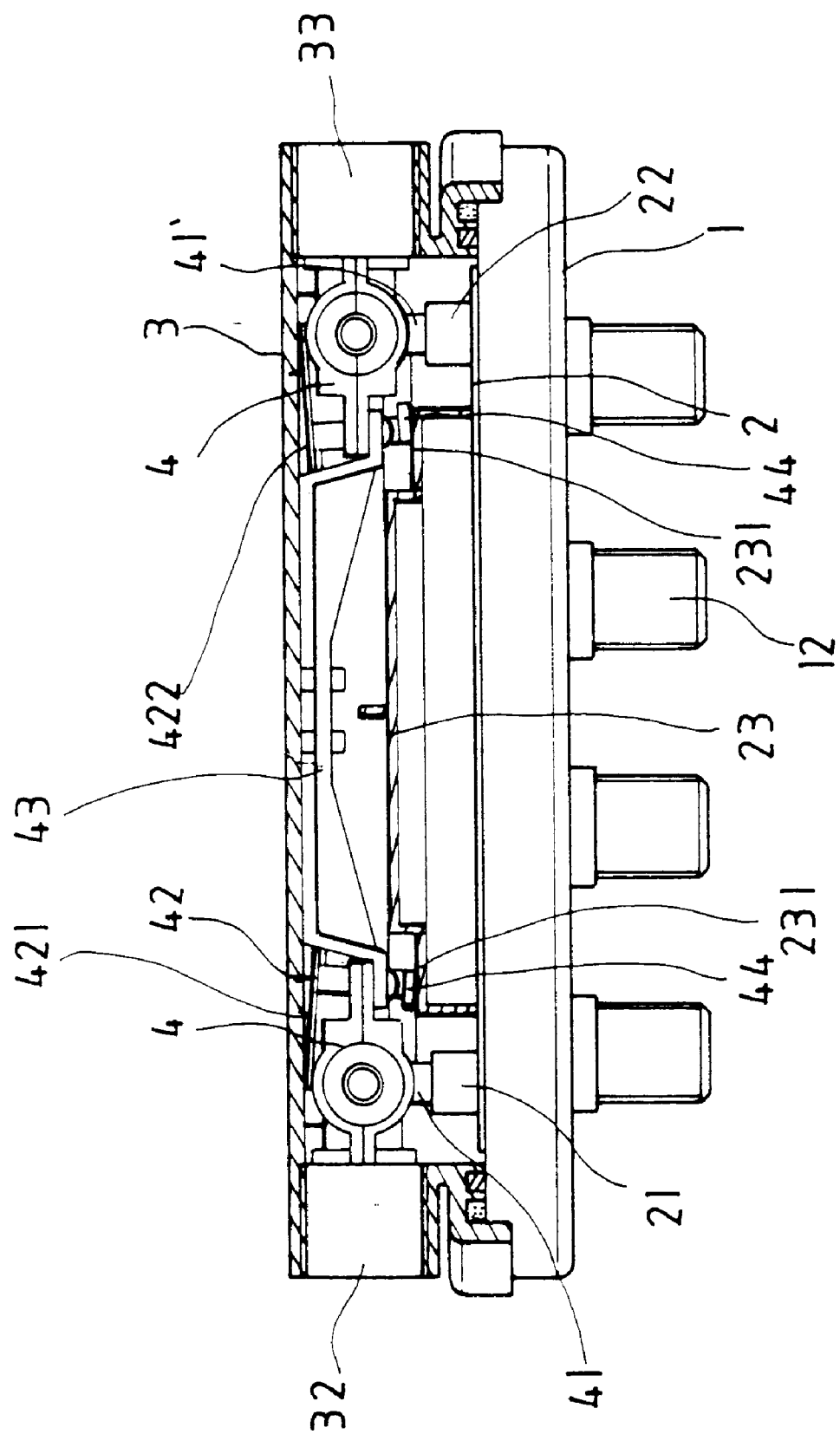
FIG. 3 is a sectional assembly view of a part of the present invention.

Referring to FIGS. 2 and 3 again, a metal spring plate 42 is provided having two opposite ends 421;422 smoothly curved upwards and respectively disposed in contact with the terminals 41;41' of the terminal holders 4 at the bottom. A locating plate 43 is fastened to the first cover 3 to hold down the metal spring plate 42, having two upright rods 44 near its two opposite ends. A protective cover 23 is fastened to the bottom side of the first cover 3 and covered over the first circuit board 2, having two downward projecting rods 231 respectively stopped against the upright rods 44 of the locating plate 43.

Figure 4:
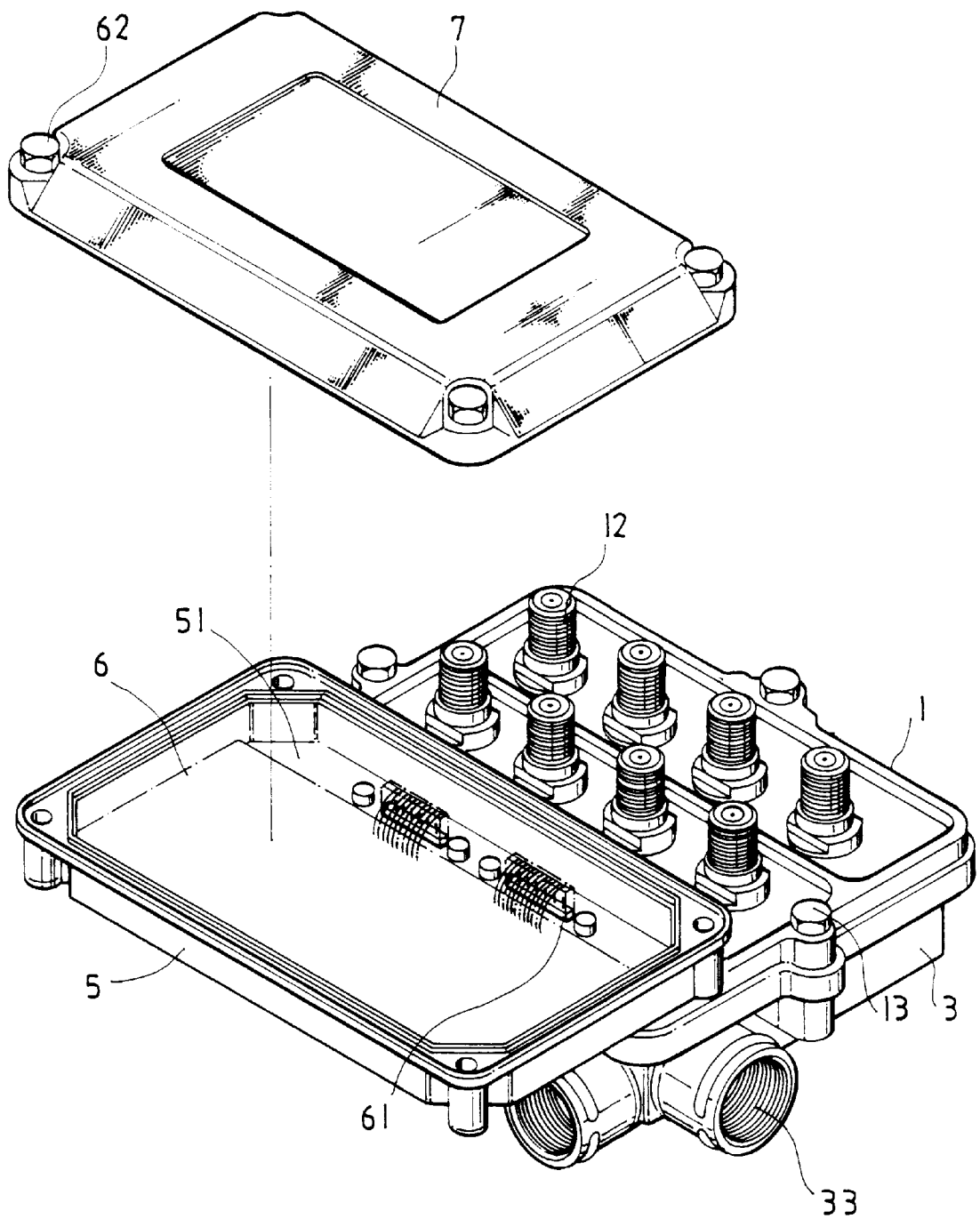
FIG. 4 is a back side view of the present invention, showing the second cover removed from the second casing, the second circuit board mounted within the second casing, the connectors raised from the back side of the first casing.

Referring to FIG. 4, a second casing 5 is made in integrity with the first casing 1 and extended from its one side. The second casing 5 comprises a second receiving chamber 6 disposed at the same side of the signal connectors 12 of the first casing 1. A second circuit board 51 is mounted inside the second receiving chamber 6 of the second casing 5, having a telephone line power circuit 61 connected to the first circuit board 2 to provide the necessary telephone signal working power supply. A second cover 7 is fastened to the second casing 5 by fastening elements for example screws 62.

Referring to FIG. 3 again, the first cover 3 and the second cover 7 are respectively fastened to the first casing 1 and the second casing 5, permitting the terminals 41;41' to be respectively plugged into the electrically conductive signal input plug hole 21 and the electrically conductive signal output plug hole 22. When assembled, the downward projecting rods 231 of the protective cover 23 are respectively stopped against the upright rods 44 of the locating plate 43, and the two opposite ends 421;422 of the metal spring plate 42 are forced downwards by the locating plate 43 and disconnected from the terminals 41;41'. Therefore, a common coaxial cable can be used to transmit wired TV signal and telephone signal to the first terminal 41. When wired TV signal or telephone signal is transmitted to the first terminal 41, it is immediately transmitted from the first terminal 41 through the electrically conductive signal input plug hole 21 to the first circuit board 2 for processing, and then transmitted from the first circuit board 2 to end users' selectors. Through the selectors, wired TV signal is transmitted to TV sets, and telephone signal is transmitted to telephone sets. Processed signal from the first circuit board 2 is simultaneously transmitted to the second signal terminal 41' for further transmission to a next adapter through a coaxial cable which extends out of the main signal output port 33.

Figure 5:
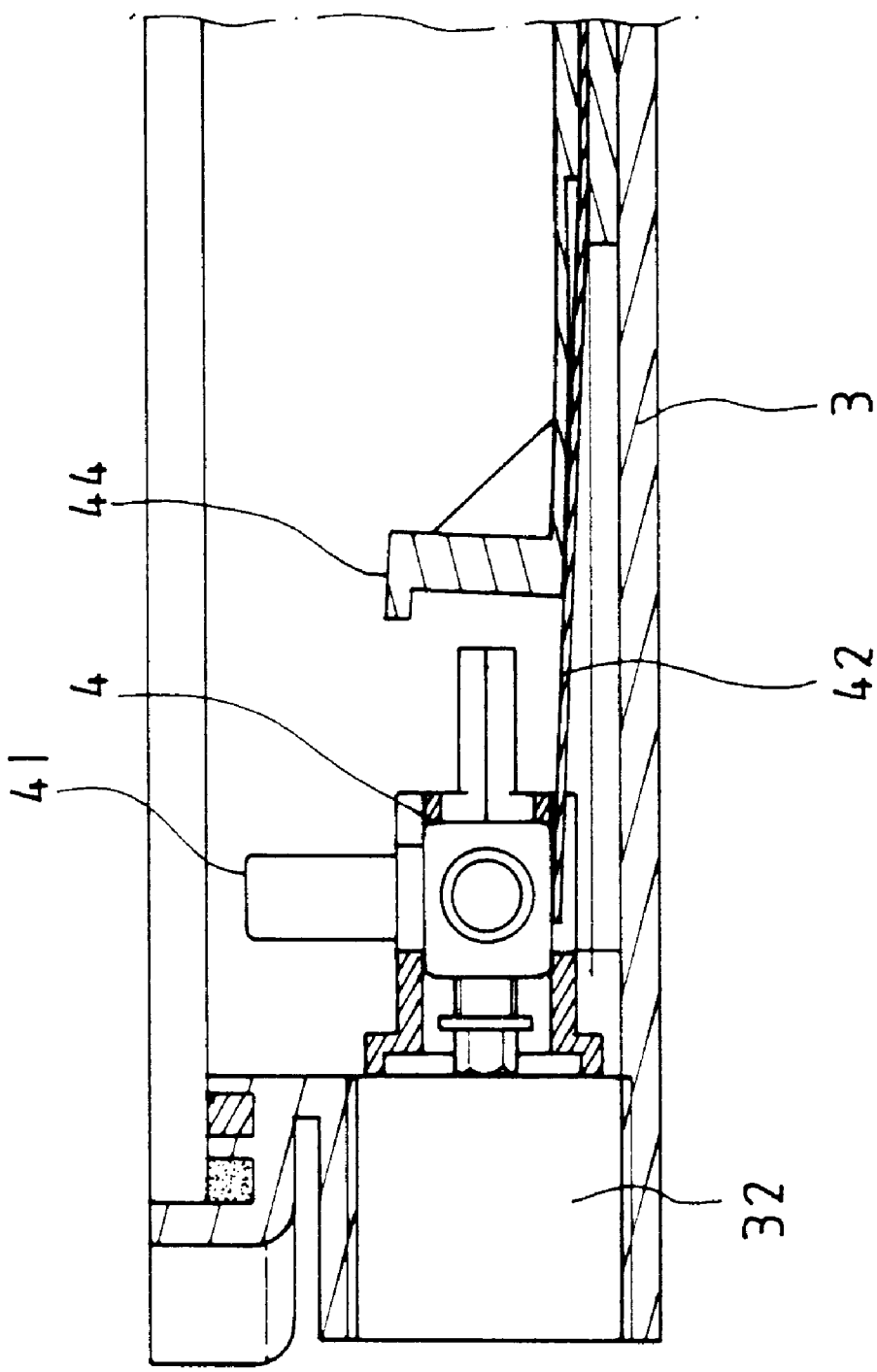
FIG. 5 is another sectional view of the present invention, showing the metal spring plate disposed in contact with the signal terminals.

Referring to FIG. 5, when the first cover 3 is disconnected from the first casing 1 during a repair work, the first circuit board 2 is disconnected from the signal terminals 41;41', and at the same time the downward projecting rods 231 of the protective cover 23 are released from the upright rods 44 of the locating plate 43, therefore the two opposite ends 421;422 of the metal spring plate 42 are released from the pressure of the upright rods 44 of the locating plate 43 and returned to their former shape and moved into contact with the signal terminals 41;41' respectively for permitting wired TV signal or telephone signal to be directly transmitted from the first signal terminal 41 to the second signal terminal 41' without through the first circuit board 2, and then transmitted from the second signal terminal 41' to the next signal adapter.

As indicated above, one common coaxial cable is used for transmitting wired TV signal and telephone signal to the main signal input port 32, permitting wired TV signal or telephone signal to be further transmitted to end users through the connectors 12.

While only one embodiment of the present invention has been shown and described, it will be understood that various modifications and changes could be made thereunto without departing from the spirit and scope of the invention disclosed.

What the invention claimed is:

1. A signal adapter including wired TV signal and telephone signal from a coaxial signal cable to end users, comprising:

a first circuit board for processing said wired TV signal and telephone signal from said coaxial signal cable;

a first casing having a first receiving chamber at one side which receives said first circuit board, and a plurality of connectors disposed at an opposite side and respectively connected to said first circuit board for receiving signal lines from end users;

a first cover fastened to said first casing by fastening elements and covered over said first circuit board, said first cover comprising at least one main signal input port through which said wired TV signal and telephone signal are transmitted from said coaxial cable to said first circuit board, and at least one main signal output port through which said wired TV signal and telephone signal are transmitted from said first circuit board to a next signal adapter through a second coaxial cable;

a second circuit board for providing a telephone signal working power supply to said first circuit board;

a second casing extended from one side of said first casing and defining a second receiving chamber which receives said second circuit board; and a second cover fastened to said second casing by fastening elements and covered over said second circuit board.

2. The signal adapter of claim 1, wherein said first circuit board comprises a signal input plug hole and a signal output plug hole;

said first cover further comprising a first signal terminal holder and a second signal terminal holder;

said first signal terminal holder further comprising a first signal terminal with one end connected to one of said signal input port and an opposite end fastened to the signal input plug hole of said first circuit board for transmitting said wired TV signal and telephone signal to said first circuit board;

said second signal terminal holder further comprising a second signal terminal having one end connected to one of said main signal output port and an opposite end fastened to the signal output plug hole of said first circuit board for transmitting processed signal from said first circuit board to the next signal adapter through said main signal output port of said first cover.

3. The signal adapter of claim 2, further comprising a metal spring plate mounted inside said first cover between said first signal terminal and said second signal terminal; said metal spring plate having two opposite ends respectively curved upwards, the two opposite ends of said metal spring plate being disposed in contact with said first signal terminal and said second signal terminal at a bottom side for signal transmission therebetween upon removal of said first cover from said first casing during a repair work; a locating plate being mounted inside said first cover, having two upright rods for imparting a pressure to the two opposite ends of said metal spring plate to disconnect said metal spring plate from said first signal terminal and said second signal terminal; a protective cover being fastened to said first casing and covered over said first circuit board, having two downward rods which impart a pressure to the upright rods of said locating plate against the two opposite ends of said metal spring plate to force the two opposite ends of said metal spring plate away from said first signal terminal and said second signal terminal when said first cover is fastened to said first casing.

4. The signal adapter of claim 1, wherein said fastening elements are screws.

* * * * *